United States Patent [19]

Kizuka

[11] Patent Number: 5,796,937
[45] Date of Patent: Aug. 18, 1998

[54] METHOD OF AND APPARATUS FOR DEALING WITH PROCESSOR ABNORMALITY IN MULTIPROCESSOR SYSTEM

[75] Inventor: Yoshitaka Kizuka, Kawasaki, Japan

[73] Assignee: Fujitsu Limited, Kawasaki, Japan

[21] Appl. No.: 536,739

[22] Filed: Sep. 29, 1995

[30] Foreign Application Priority Data

Sep. 29, 1994 [JP] Japan ................... 6-235422

[51] Int. Cl.$^6$ ................................. G06F 11/00
[52] U.S. Cl. ............... 395/182.11; 395/182.09; 395/182.05; 364/268; 364/268.3
[58] Field of Search ............ 395/182.11, 182.09, 395/182.01, 181, 182.05

[56] References Cited

U.S. PATENT DOCUMENTS

| | | | |
|---|---|---|---|
| 3,787,816 | 1/1974 | Hauck | 395/182.01 |
| 3,812,468 | 5/1974 | Wollum | 395/182.09 X |
| 3,937,936 | 2/1976 | Saporito | 395/182.09 |
| 4,415,973 | 11/1983 | Evans | 395/182.11 X |
| 4,503,534 | 3/1985 | Budde | 395/182.11 X |
| 4,654,846 | 3/1987 | Goodwin | 395/182.11 |
| 4,807,228 | 2/1989 | Dahbura | 395/182.11 |
| 4,866,712 | 9/1989 | Chao | 395/181 X |
| 4,933,838 | 6/1990 | Elrod | 395/182.01 |
| 5,003,464 | 3/1991 | Ely | 395/182.09 X |
| 5,214,778 | 5/1993 | Glider | 395/181 |

*Primary Examiner*—Robert W. Beausoliel, Jr.
*Assistant Examiner*—Dieu-Minh Le
*Attorney, Agent, or Firm*—Staas & Halsey

[57] ABSTRACT

A multiprocessor system has processors for processing distributed works, a monitoring facility for detecting an abnormality in any one of the processors, an administration facility for providing information about the abnormal processor and information about a redundant processor, and a work allocation facility for seeking the distributed works of the abnormal processor from a work table according to these pieces of information and allocating the sought works to given ones of the processors. The system includes an abnormality measures table that selectively describes measures to be taken for each of the distributed works against an abnormality. The work allocation facility determines, for each of the distributed works of the abnormal processor, a measure to be taken according to the abnormality measures table and allocates the distributed works of the abnormal processor to given ones of the processors. If the abnormality is recursive, allocating any work for which a specific measure such as rerun or continuation is to be taken is suspended. If the redundant processor is being initialized, allocating works to the redundant processor is delayed.

4 Claims, 18 Drawing Sheets

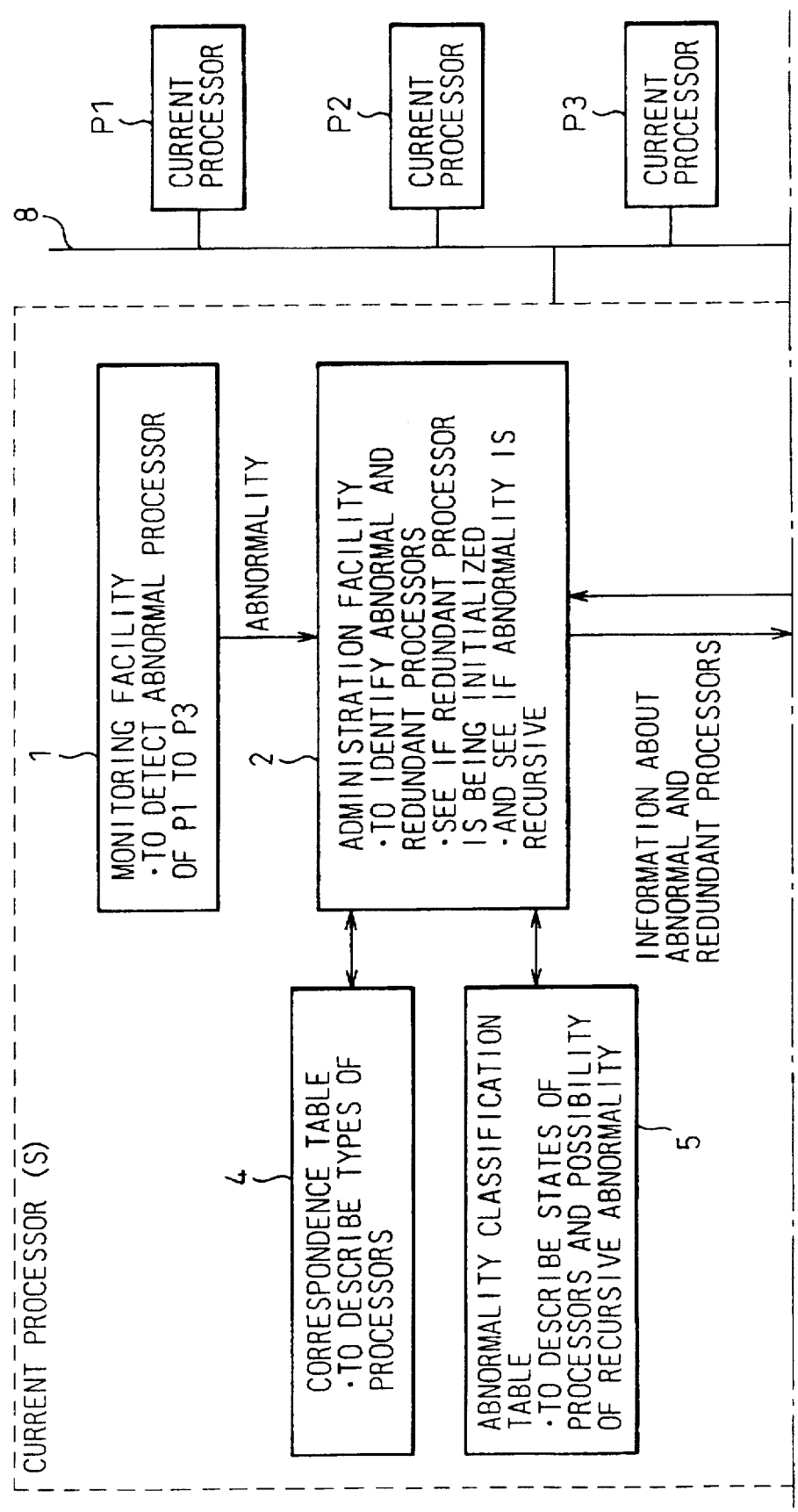

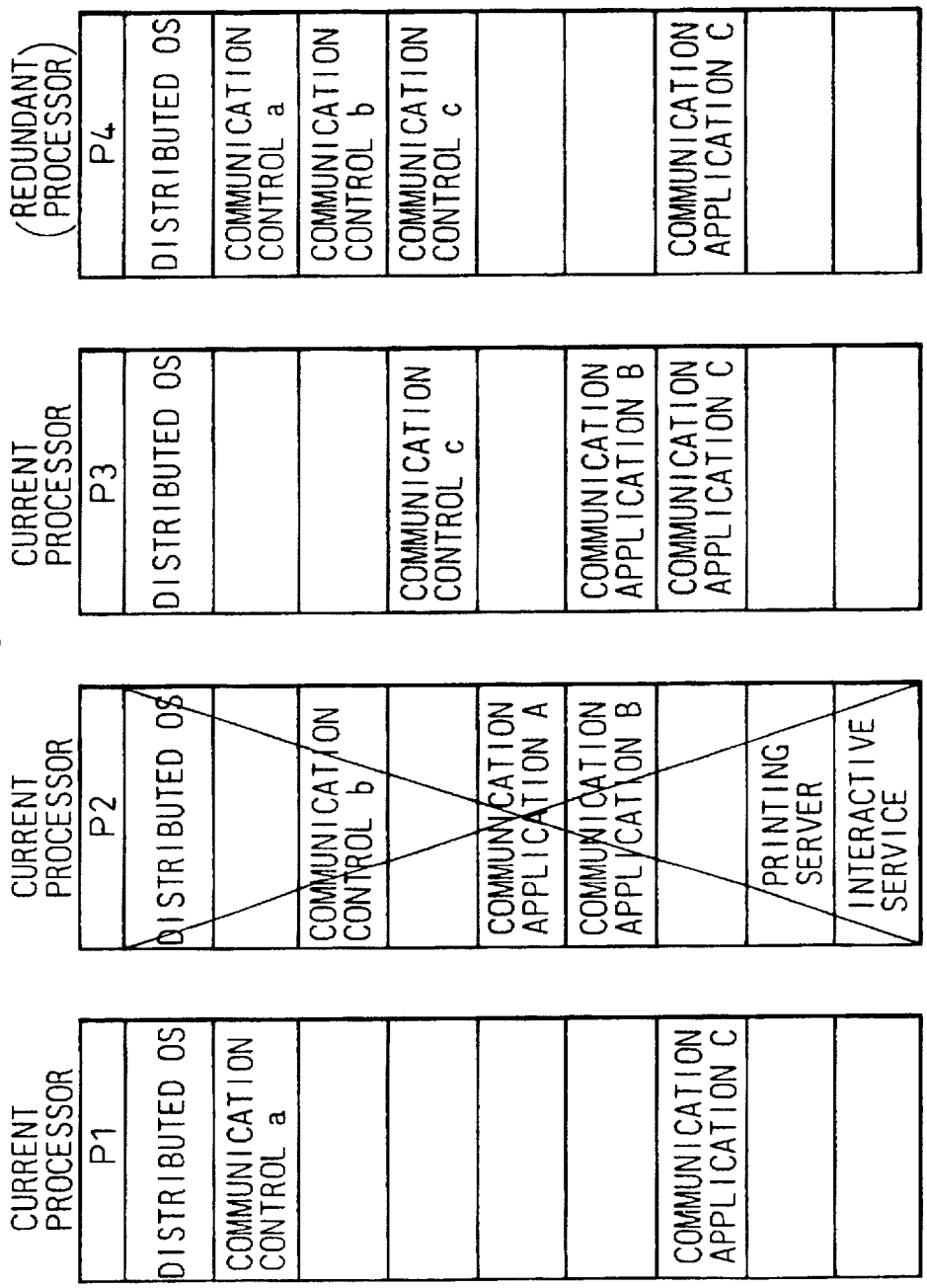

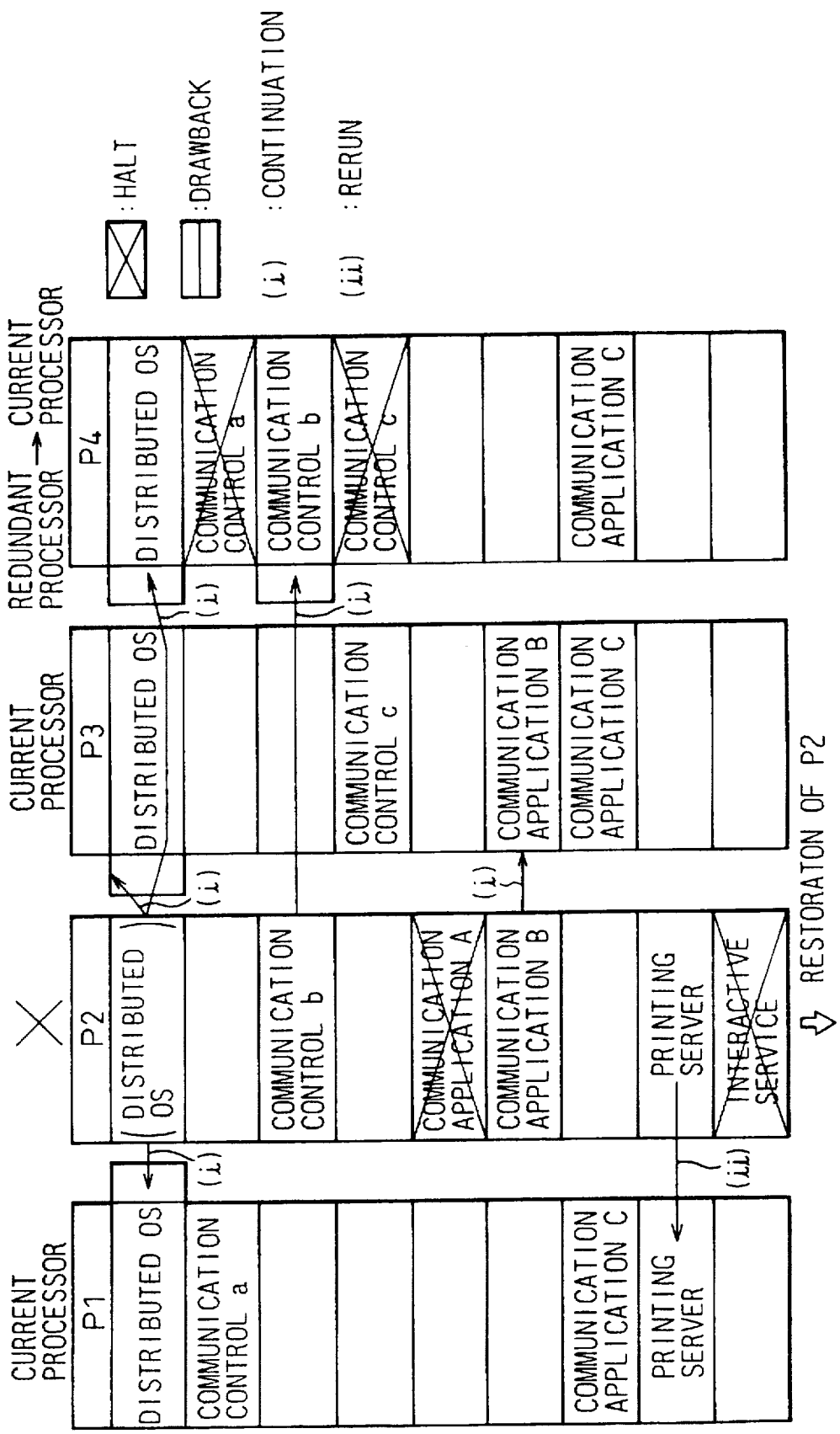

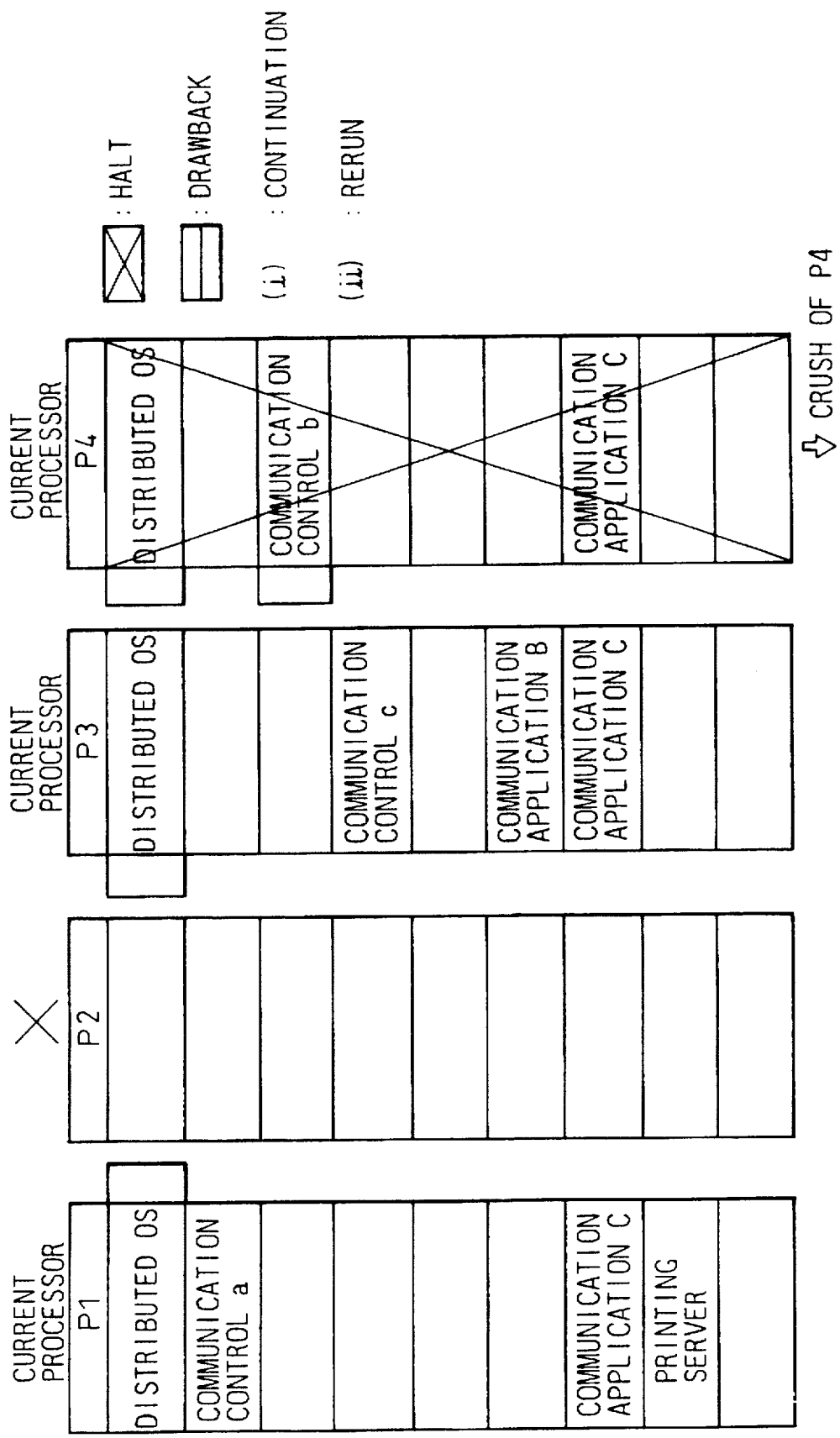

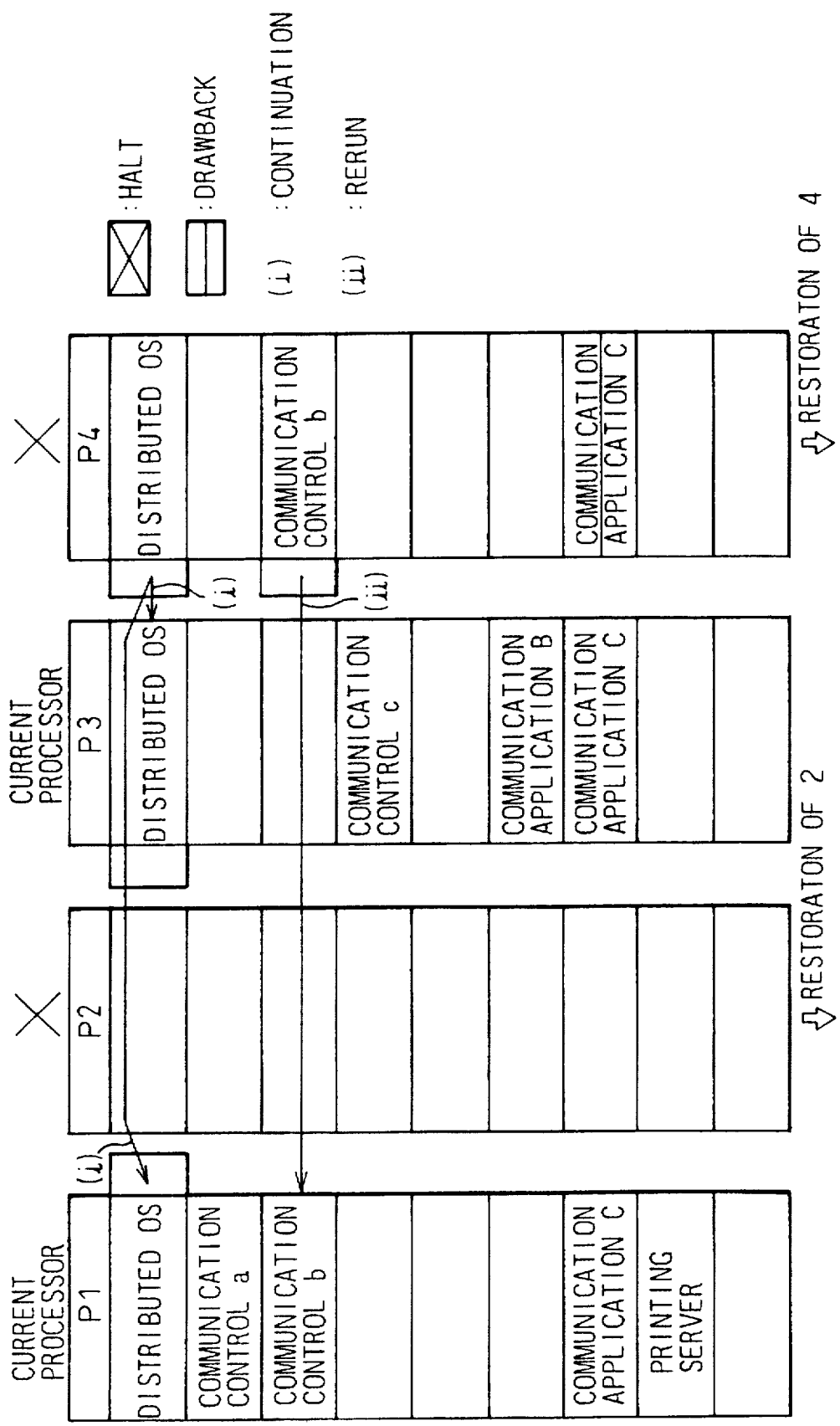

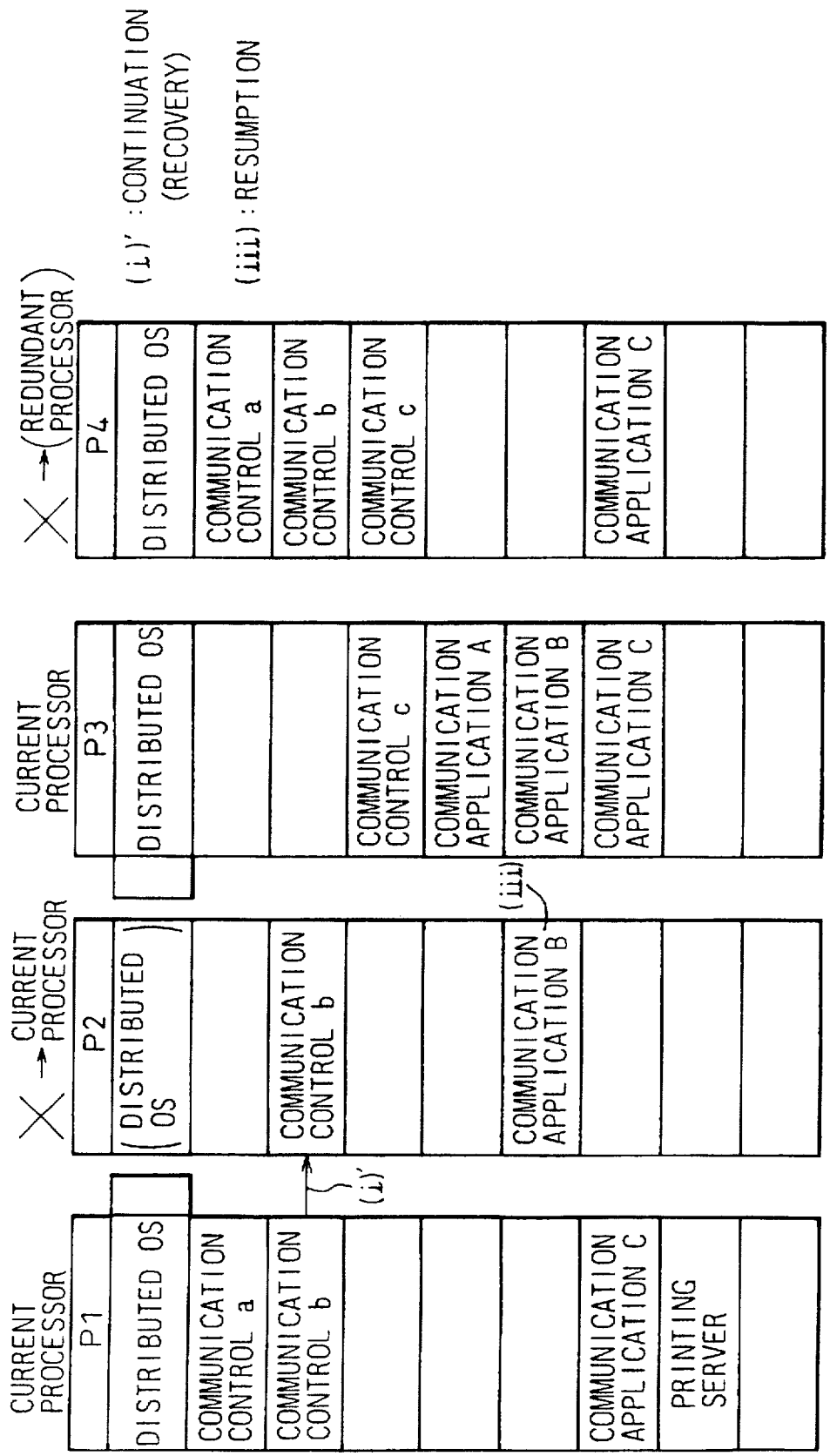

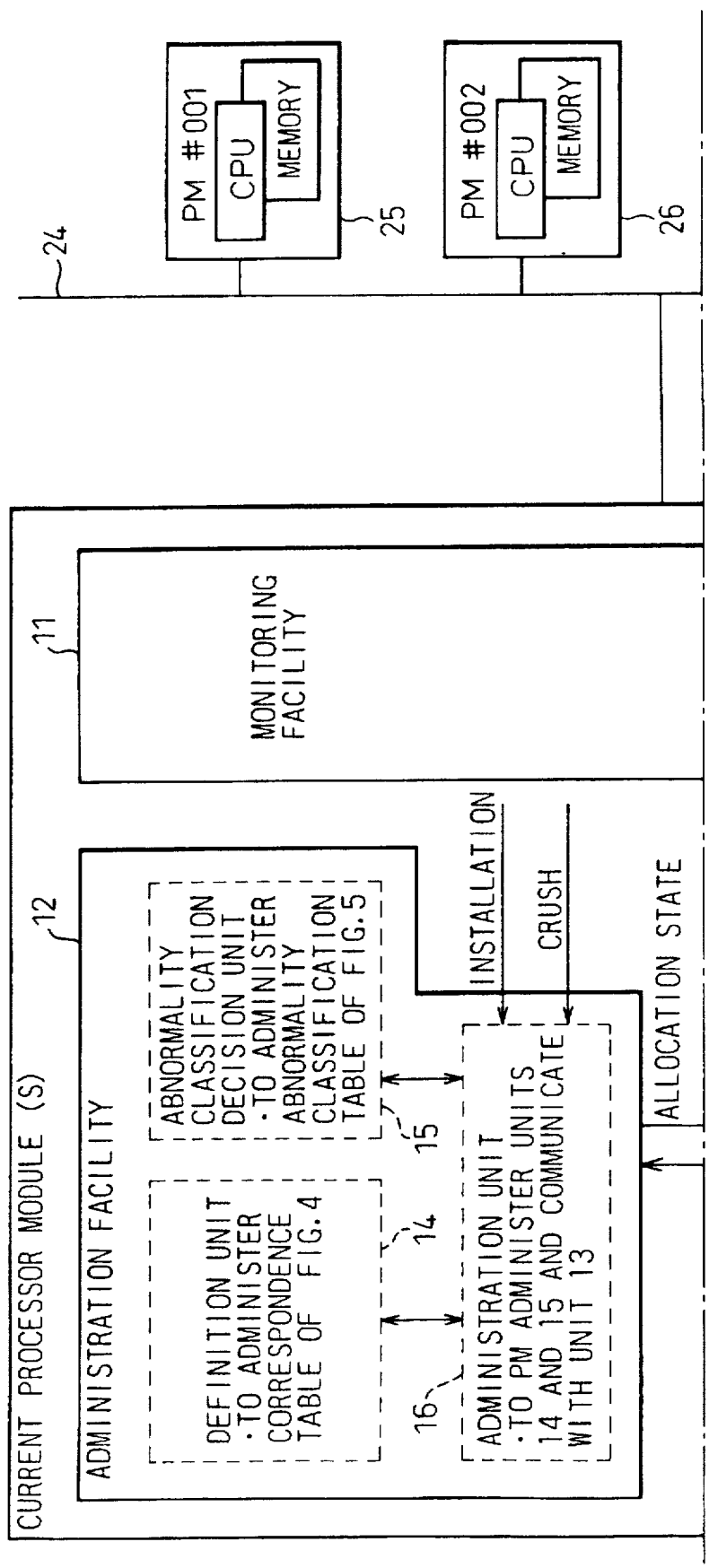

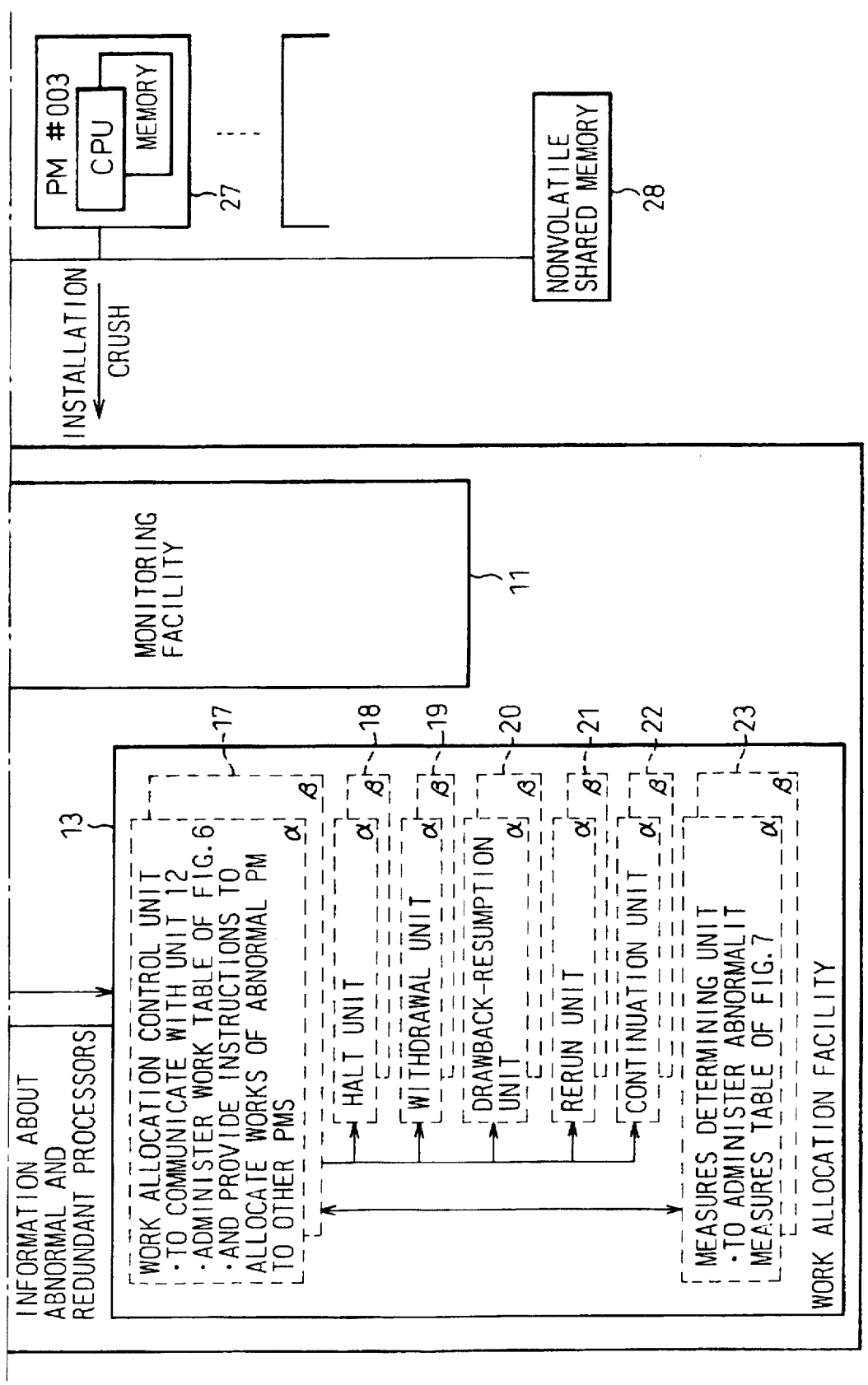

Fig. 4

| NAME OF PM | MOUNTING NUMBER OF PM | |
|---|---|---|
| pm0a | #001 | 31 |
| pm0b | #002 | |
| pm0c | #003 | |
| ——— | #004 | |

IN THIS FIGURE:

001~ #003: CURRENT PM

004: REDUNDANT PM

Fig. 5

| NAME OF PM | STATE OF PM | POSSIBILITY OF RECURSIVE ABNORMALITY | |
|---|---|---|---|
| pm0a | RESTORING | YES | 32 |
| pm0b | OPERATING | NO | |
| pm0c | CHANGING | YES | |
| ——— | INITIALIZING (INTO HOT STANDBY STATE) | NO | |

Fig.6

| WORK | DESTINATION PM | | | |
|---|---|---|---|---|
| DISTRIBUTED OS | pm0a | pm0b | pm0c | REDUNDANT |
| COMMUNICATION CONTROL a | pm0a | REDUNDANT | | |
| COMMUNICATION CONTROL b | pm0b | REDUNDANT | | |
| COMMUNICATION CONTROL c | pm0c | REDUNDANT | | |
| COMMUNICATION APPLICATION A | pm0b | | | |
| COMMUNICATION APPLICATION B | pm0b | pm0c | | |
| COMMUNICATION APPLICATION C | pm0a | pm0c | REDUNDANT | |
| PRINTING SERVER | pm0b | | | |
| INTERACTIVE SERVICE | pm0b | | | |

Fig.7

| WORK ID | WORK | MEASURES AGAINST PM ABNORMALITY |
|---|---|---|
| 1 | BASE OF OS | SYSTEM HALT |
| 2 | DISTRIBUTED OS (SYSTEM SERVICE) | CONTINUATION |
| 3 | COMMUNICATION CONTROL | DRAWBACK AND RESUMPTION, CONTINUATION AND RECOVERY |
| 4 | HOST LINKAGE SERVICE (X) | RERUN |
| 5 | HOST LINKAGE SERVICE (Y) | RERUN AND RECOVERY |
| 6 | INTERACTIVE SERVICE | HALT |
| 7 | COMMUNICATION APPLICATION | DRAWBACK AND RESUMPTION, CONTINUATION |
| 8 | PRINTING SERVER | RERUN |

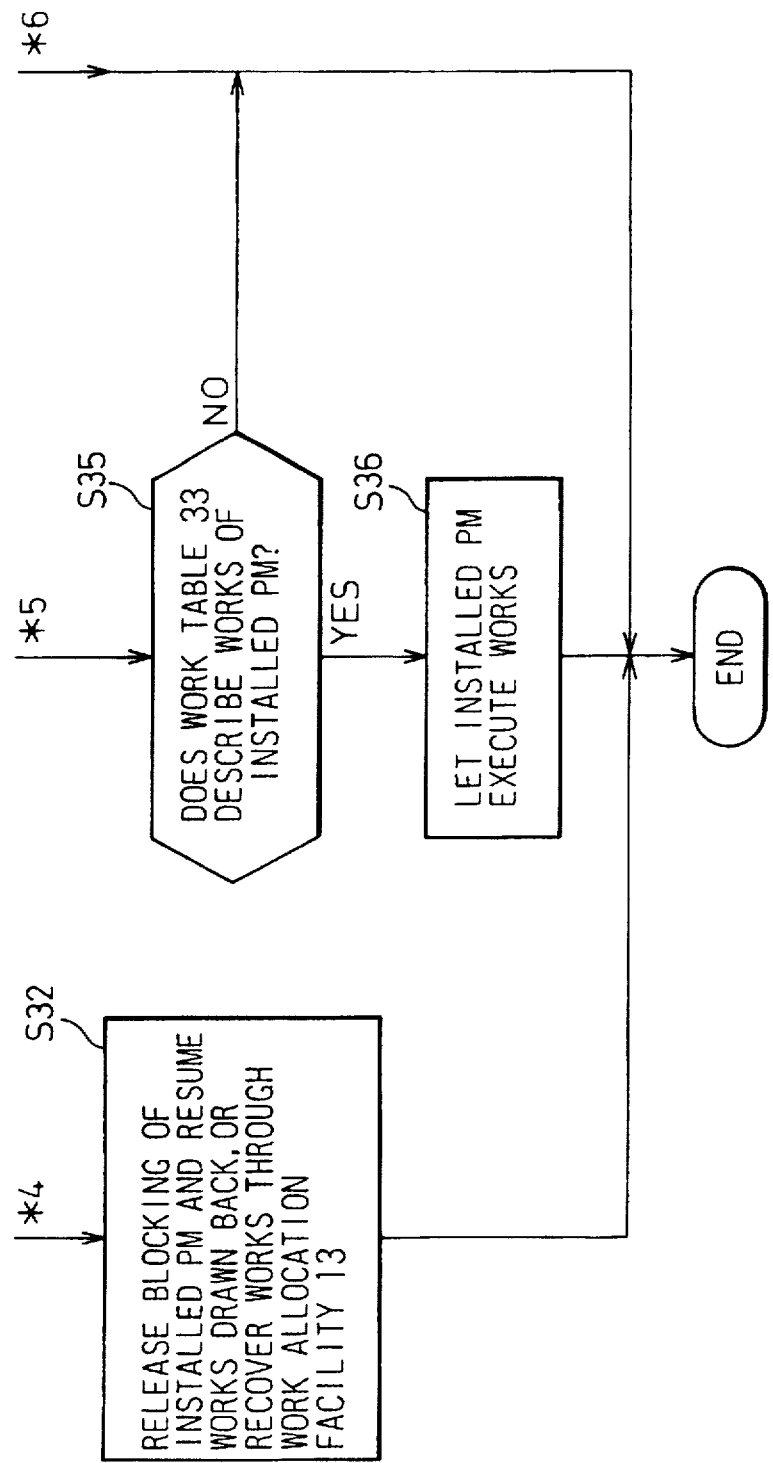

HALTING SYSTEM

P1~P3: CURRENT PROCESSOR

DRAWING BACK AND RESUMING ABNORMAL PROCESSOR P1
(NO REDUNDANT PROCESSOR)

DRAWING BACK

RESUMING WORKS

METHOD OF AND APPARATUS FOR DEALING WITH PROCESSOR ABNORMALITY IN MULTIPROCESSOR SYSTEM

BACKGROUND OF THE INVENTION

1. Field of the Invention

The present invention relates to a method of and an apparatus for dealing with a processor abnormality in a multiprocessor system, and particularly, to a multiprocessor system having processors for processing distributed works. When a monitoring facility detects an abnormality in any one of the processors, an administration facility provides information about the detected abnormal processor as well as information about a redundant processor, to a work allocation facility which seeks the distributed works of the abnormal processor from a work table according to these pieces of information and allocates the sought works to given ones of the processors.

The present invention allocates the distributed works of the abnormal processor to the other processors in a way to improve the fault tolerance of the multiprocessor system and secure a 24-hour operation of the system.

2. Description of the Related Art

A multiprocessor system according to a prior art loosely couples processors each having a CPU and a memory through a high-speed bus and distributes works including an operating system (OS), applications, and communication control to the processors.

To improve the fault tolerance of the system, it is important to provide improved measures to deal with a processor abnormality. The prior art is incapable of optionally setting measures to deal with an abnormality depending on the processing conditions of the system and the requirements of a user. For example, the prior art is incapable of localizing the influence of an abnormality in one processor, to protect other processors.

If the cause of a processor abnormality is a software failure such as an error in take-over information about a work processed by the abnormal processor, the abnormality will necessarily occur in a substitute processor that reruns or continues the work of the abnormal processor. This will involve another substitute process, which will be again abnormal, to thereby expand the processor abnormality. Consequently, the fault tolerance of the system will deteriorate.

Works shared by an abnormal processor must be allocated to a redundant processor after the redundant processor is initialized, or the works will be incorrectly taken over by the redundant processor and the redundant processor will ineffectively serve as a substitute processor.

SUMMARY OF THE INVENTION

An object of the present invention as to deal with a processor abnormality in various ways, suppress an expansion of the processor abnormality, and effectively use a redundant processor.

In order to attain the above object, the present invention provides a multiprocessor system having processors for processing distributed works, a monitoring facility for detecting an abnormality in any one of the processors (P1 to P4), an administration facility for providing information about the detected abnormal processor as well as information about a redundant processor, and a work allocation facility for seeking the distributed works of the abnormal processor from a work table according to these pieces of information and allocating the sought works to given ones of the processors. The system includes an abnormality measures table that selectively describes measures to be taken for each of the distributed works against an abnormality. The work allocation facility determines, for each of the distributed works of the abnormal processor, a measure to be taken according to the abnormality measures table and allocates the distributed works of the abnormal processor to given ones of the processors. If the abnormality is recursive, allocation of any work for which a specific measure such as rerun or continuation is to be taken is suspended. If the redundant processor is being initialized, allocating works to the redundant processor is delayed.

BRIEF DESCRIPTION OF THE DRAWINGS

The above object and features of the present invention will be more apparent from the following description of the preferred embodiments with reference to the accompanying drawings, wherein:

FIGS. 1A and 1B show a basic structure of a multiprocessor system according to the present invention;

FIGS. 2A, 2B, 2C, 2D, and 2E explain measures to deal with an abnormality occurring in one of processors of the multiprocessor system;

FIGS. 3A and 3B explain the operation of the multiprocessor system according to the present invention;

FIG. 4 shows a processor module correspondence table according to the present invention;

FIG. 5 shows an abnormality classification table according to the present invention;

FIG. 6 shows a work table (corresponding to FIGS. 2A to 2D) according to the present invention;

FIG. 7 shows an abnormality measures table according to the present invention;

FIGS. 9A and 9B explain procedures (part 2) to deal with a crash or an installation of a processor module, according to the present invention.

DESCRIPTION OF THE PREFERRED EMBODIMENTS

Before describing the embodiments of the present invention, the related art and the disadvantages therein will be described with reference to the related figures.

FIGS. 10A to 10D show measures to deal with a hardware or software abnormality in any one of processors P1 to P4. Among these processors, the processors P1 to P3 are current processors, and the processor P4 is a redundant processor. It is supposed that an abnormality occurs in the current processor P1.

Measures to deal with the abnormality include:

halting all of the current processors;

drawing back works processed by the abnormal processor P1 and resuming the works from the beginning after the abnormal processor P1 is restored to a normal state;

letting substitute processors rerun the works of the abnormal processor P1 from the beginning; and letting the substitute processors continue the works of the abnormal processor P1 from the time when the abnormality occurred.

In this 1specification. the "substitute processor" may be any one of the redundant and current normal processors.

The multiprocessor system selects one or a plurality of these measures. The selection is solely carried out by an operating system (OS), and therefore, there is no room for a user or an application for freely selecting one or a plurality of them.

In the above circumstances, these measures are taken without actively determining whether the abnormality is a hardware abnormality or a software abnormality.

The software abnormality is caused by an error in a work program per se or in take-over information that is produced and used during the execution of a work program in each processor.

To solve these problems, the present invention adopts an abnormality measures table that selectively describes measures to be taken for each of works shared by processors of a multiprocessor system against an abnormality. If an abnormality repeatedly occurs (recursive error) during restoration of the processor that has caused the abnormality or during a change-over to a substitute processor, the system determines that the abnormality is due to a software error and suspends allocation of the related work by rerun or continuation to the substitute processor. If a redundant processor is being initialized, the system delays the allocation of works to the redundant processor. In this way, the system provides various measures to deal with a processor abnormality, suppresses an expansion of the processor abnormality, and effectively uses a redundant processor.

Figure 1B:
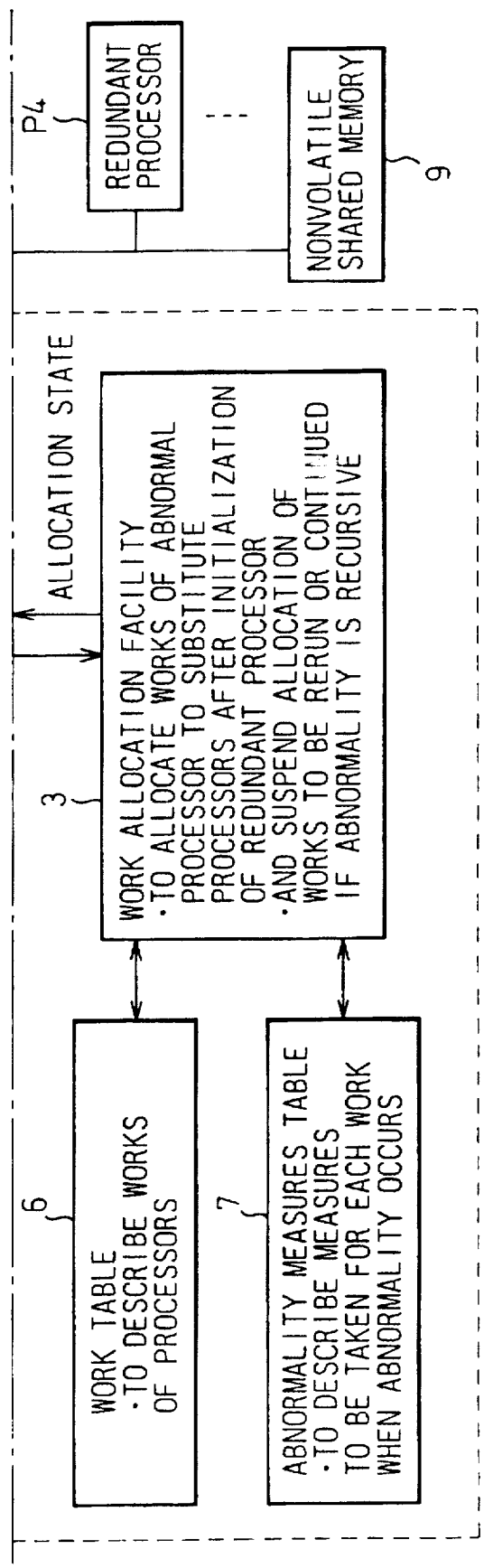

FIGS. 1A and 1B explain the principle of a multiprocessor system according to the present invention.

A processor monitoring facility 1 monitors the operating states of current processors P1 to P3 and detects an abnormality in any one of them.

An administration facility 2 notifies a work allocation facility 3 of information about an abnormal processor and a redundant processor and administers information about a possibility of recursive abnormality as well as information about whether or not a redundant processor is being initialized. The recursive abnormality usually occurs when one processor takes over a work from another.

The work allocation facility 3 allocates works of the abnormal processor sought from a work table 6 to given processors according to measures described in an abnormality measures table 7. If the administration facility 2 notifies the work allocation facility 3 that there is a possibility of recursive abnormality, the facility 3 suppresses allocating works to be rerun or continued to the other processors. If the facility 2 notifies the facility 3 that the redundant processor is being initialized, the facility 3 delays allocating works to the redundant processor.

A correspondence table 4 (refer to FIG. 4) describes the classification of the current and redundant processors, i.e., the names and mounting numbers thereof.

An abnormality classification table 5 (refer to FIG. 5) describes the state such as restoring, operating, or initializing state of each processor as well as a possibility of recursive abnormality of each processor.

The work table 6 (refer to FIG. 6) describes works and processors that share the works.

The abnormality measures table 7 (FIG. 7) describes, for each work, measures such as halt, drawback, rerun, and continuation to deal with an abnormality.

The multiprocessor system also has a high-speed bus 8 and a nonvolatile shared memory 9 for storing take-over information to be transferred from an abnormal processor to substitute processors. The processors of the system are the current processors P1 to P3 and the redundant processor P4.

For the sake of explanation, the tables 4 to 7 are separated from each other. The arrangements and storage of information contained in these tables are optional.

The monitoring facility 1 notifies the administration facility 2 of an abnormality occurring in any one of the current processors P1 to P3.

The administration facility 2 refers to the correspondence table 4 and abnormality classification table 5, to identify the abnormal processor and a redundant processor and determine whether or not the abnormality is recursive and whether or not the redundant processor is being initialized. These pieces of information are sent to the work allocation facility 3.

The work allocation facility 3 refers to the work table 6, to identify works shared by he abnormal processor. According to measures sought from the abnormality measures table 7, the facility 3 allocates the works of the abnormal processor to the redundant processor P4, etc. Thereafter, the facility 3 notifies the administration facility 2 of the allocation states of the works.

Not only the redundant processor P4 but also any one of the current normal processors may serve as a substitute processor. Accordingly, the current normal processors execute newly allocated works in addition to works originally shared thereto.

The administration facility 2 updates the correspondence table 4 according to information about the abnormal and redundant processors. The facility 2 also updates the abnormality classification table 5 according to information from the work allocation facility 3.

The contents of the work table 6 and abnormality measures table 7 may be set or updated by a user or application according to the capacity and utilization mode of the multiprocessor system.

As mentioned above, the method of dealing with an abnormal processor according to the present invention is applied to a multiprocessor system having processors for processing distributed works, the monitoring facility 1 for detecting an abnormality in any one of the processors, the administration facility 2 for providing information about the detected abnormal processor and information about a redundant processor, and the work allocation facility 3 for seeking the distributed works of the abnormal processor from the work table 6 according to these pieces of information and allocating the sought works to given ones of the processors. The method of the present invention uses the abnormality measures table 7 that selectively describes measures to be taken for each of the distributed works against an abnormality thereof. The method lets the work allocation facility 3 determine, for each of the distributed works of the abnormal processor, a measure to be taken according to the abnormality measures table 7 and allocate the works to given ones of the processors accordingly.

The apparatus according to the present invention for dealing with a processor abnormality in a multiprocessor system having processors to process distributed works has the monitoring facility 1 for detecting an abnormality in any one of the processors, the administration facility 2 for providing information about the abnormal processor and information about a redundant processor, the abnormality measures table 7 that selectively describes measures to be taken for each of the distributed works against an abnormality, and the work allocation facility 3 for seeking the distributed works of the abnormal processor from the work table 6 according to these pieces of information and allocating the sought works to given ones of the processors according to the measures described in the abnormality measures table 7.

With the abnormality measures table 7 that describes, for each work, measures such as halt, drawback, rerun, and continuation to deal with an abnormality and with the abnormality classification table 5 that describes a possibility of recursive abnormality for each processor and whether or not a redundant processor is being initialized, the system is capable of selecting the destination of each of the works of the abnormal processor, suppressing an expansion of the abnormality, and efficiently using the redundant processor.

FIGS. 2A, 2B, 2C, 2D, and 2E explain measures to deal with an abnormality occurred in a processor for processing distributed works in a multiprocessor system. The multiprocessor system includes current processors P1 to P3 and a redundant processor P4 that has been initialized to a hot-standby state. It is supposed that an abnormality has occurred in the current processor P2.

Works of the current processor P2 now becoming an abnormal processor are allocated to the other processors as follows:

- a distributed operating system (OS) is continued by the current processors P1 and P3 and redundant processor P4;
- communication control b is continued by the redundant processor P4;
- a communication application A is continued by the current processor P3;
- a communication application B is drawn back;
- a printing server is rerun by the current processor P1; and
- an interactive service is halted.

When the redundant processor P4 continues the communication control b, its communication control works a and c are halted.

Once the abnormal processor P2 is restored to a normal state, the processor P2 continues (recovers) the communication control b from the redundant processor P4 and reruns the communication application B that has been drawn back.

The restored processor P2, now becoming a current processor, continues the communication control b from the redundant processor P4 because the communication control b is closely related to the communication application B.

The distributed OS is not dedicated to any one of the processors P1 to P4. Accordingly, the OS shared by the processor P2 before the occurrence of the abnormality is not restored even after the restoration of the processor P2.

When the processor P2 causes the abnormality, the interactive service thereof is halted. At this time, take-over information about the interactive service is not held in the nonvolatile shared memory 9, while take-over information of each of the other works is held in the memory 9.

The substitute processors, i.e., the current processors P1 and P3 and redundant processor P4 continue or rerun the works for the abnormal processor P2 according to the take-over information stored in the memory 9.

A usual measure to deal with a recursive abnormality is generally "drawback." Namely, the take-over information that has caused the recursive abnormality is once removed, and the inherent work related to the take-over information is rerun by the processor that has caused the abnormality after the processor is restored to a normal state. Note that each current processor produces take-over information for each work when executing the work and uses the thus produced information when continuing the work.

To achieve the draw back, the take-over information of a work of the abnormal processor P2 by any other optional processor is withdrawn, i.e., the take-over information is deleted from the memory 9.

At this time, the work of the abnormal processor P2 is blocked against processing requests from the other processors.

A multiprocessor system according to an embodiment of the present invention will be explained with reference to FIGS. 3A to 8B. For the sake of explanation, this system has processor modules (PMs) each including a CPU and a memory.

FIGS. 3A and 3B are general views showing the multiprocessor system. The system has a monitoring facility 11, an administration facility 12, a work allocation facility 13, a definition unit 14, an abnormality classification decision unit 15, an administration unit 16, a work allocation control unit 17, a halt unit 18, a withdrawal unit 19, a drawback-resumption unit 20, a rerun unit 21, a continuation unit 22, a measures determining unit 23, a high-speed bus 24, the processor modules (PMs) 25 to 27, and a nonvolatile shared memory 28.

FIGS. 4 to 7 show variety of tables, that is, a correspondence table 31, an abnormality classification table 32, a work table 33, and an abnormality measures table 34, respectively. Note that each processor module (PM) is identified by a name used by software but not by a mounting number. The correspondence between the name and the mounting number is described in the table 31.

The monitoring facility 11, administration facility 12, and work allocation facility 13 are realized by one or a plurality of PMs, which receive a signal indicating an installation or a crush from any one of the PMs 25 to 27 through the high-speed bus 24 and the monitoring facility 11. Here, the "installation" means to put a new or restored PM in an operable state in terms of hardware. The signal indicating an installation or crush involves the mounting number of the PM in question.

Upon detecting a crush, i.e., an abnormality in any one of the PMs, the administration facility 12 acts as follows:

- the definition unit 14 seeks the names and mounting numbers of the abnormal and redundant PMs corresponding thereto from the correspondence table 31 of FIG. 4;
- the abnormality classification decision unit 15 determines a possibility of the abnormality being recursive and whether or not the redundant PM is being initialized according to the abnormality classification table 32 of FIG. 5; and
- the administration unit 16 notifies the work allocation facility 13 of these pieces of information.

Upon receiving the information, the work allocation facility 13 acts as follows:

- the work allocation control unit 17 finds works that have been shared by the abnormal PM before the abnormality according to the work table 33 of FIG. 6;
- the measures determining unit 23 determines a measure to be taken for each work according to the abnormality measures table 34 of FIG. 7 and selects PMs to which the works are allocated; and
- the work allocation control unit 17 instructs the allocation of the works to the corresponding one of the units 18 to 22.

The work allocation facility 13 may inquire the administration facility 12 about the contents of the correspondence table 31.

The halt unit 18 to the continuation unit 22 operate according to the instructions from the work allocation control unit 17. The processing states of the units 18 to 22 are notified to the administration facility 12.

The continuation unit 22, for example, uses takeover information about a work to be continued and changes over the work to a substitute PM, which continues the work. The start and completion of each change-over and changes in work allocations are notified to the administration facility 12, which updates the abnormality classification table 32 according to the thus notified information.

The administration facility 12 updates the correspondence table 31 after identifying the abnormal and redundant PMs and allocating the redundant PM to the name of the abnormal PM. According to the determination of the measures determining unit 23, the work allocation facility 13 updates the work table 33.

Each of the halt unit 18 to the measures determining unit 23 has parts α, β, and so on to handle works, respectively. For example, the part a handles a distributed OS.

A notice signal of, for example, the start or completion of a change-over operation is sent from one of the parts α, β, and so on of one of the units 18 to 23 to the administration facility 12. After all works of the abnormal processor are changed over to substitute processors through the units 18 to 23 and after these units notify the administration facility 12 of the change-over operations, the abnormality classification table 32 is updated. For example, the state of the processor module pm0c in the table 32 is changed from "changing" to "operating" and the recursive abnormality possibility thereof is changed from "YES" to "NO."

The abnormality measures table 34 has "drawback and rerun" and "continuation and resumption" as alternatives for a communication control work, and "drawback and rerun" and "continuation" as alternatives for a communication application work. The measures determining unit 23 selects one of the alternatives.

The "continuation" in the table 34 means that a work changed over to a substitute PM is continued by the substitute PM even after the abnormal PM is restored to a normal state. An example of the "continuation" is the communication application A of FIGS. 2A to 2C. The "continuation and resume" in the table 34 means that a work changed over to a substitute PM is recovered by the abnormal PM after the abnormal PM is restored to a normal state. An example of the "continuation and resume" is the communication control b of FIGS. 2A to 2E. The difference between the "continuation" and the "continuation and resume" resembles the difference between the "rerun" and the "rerun and recovery."

Among the works of the abnormal PM, those given to substitute PMs are continued or rerun by the redundant PM or the other optical PMS, and those drawn back and to be resumed are suspended until the abnormal PM is restored to a normal state. In this way, the present invention can provide various measures in dealing with a processor abnormality.

The multiprocessor system according to the present invention has the following functions:

(1) a substitute function including a continuation function and a rerun function;
(2) a drawback function and a resumption function;
(3) a system halt function;
(4) a function of monitoring a recursive abnormality;
(5) a function of withdrawing the take-over information of a work when the drawback-resumption measure is taken for the work;
(6) a function of delaying a change-over of works to a redundant PM when the redundant PM is being initialized;
(7) a permanent drawback function of halting an automatic restoration operation by the system on a PM if the PM repeats drawback and resumption;
(8) a function of defining the above functions (1) to (7) for each work or for each operation;
(9) a function of selecting one of the above functions (1) to (7); and
(10) a function of selecting one of the following measures for each work of an abnormal PM if there is no redundant PM:

carrying out the work by another current PM;
blocking requests from other PMs to the work, i.e., stopping a request from another PM for the work and withdrawing take-over information about the work by another PM; and
not carrying out the work by any other PM.

Major of the function (4) is carried out by the administration facility 12, and the other functions are carried out by the work allocation facility 13. For example, the function (6) is carried out by the rerun unit 21 or the continuation unit 22 depending on a measure to be taken for a work allocated to the redundant PM.

If the redundant PM is being initialized, this fact is notified from the administration facility 12 to the work allocation facility 13. Information that an abnormal PM has been restored to a normal state is notified from the facility 13 to the facility 12. Then, the facility 12 describes the restored PM as a redundant PM in the correspondence table 31.

The function (5) is carried out by one of the normal current PMs when the drawback or resumption measure is taken. When the function (5) is carried out with the resumption measure, take-over information is made useless for the other current PMs.

Figure 8A:
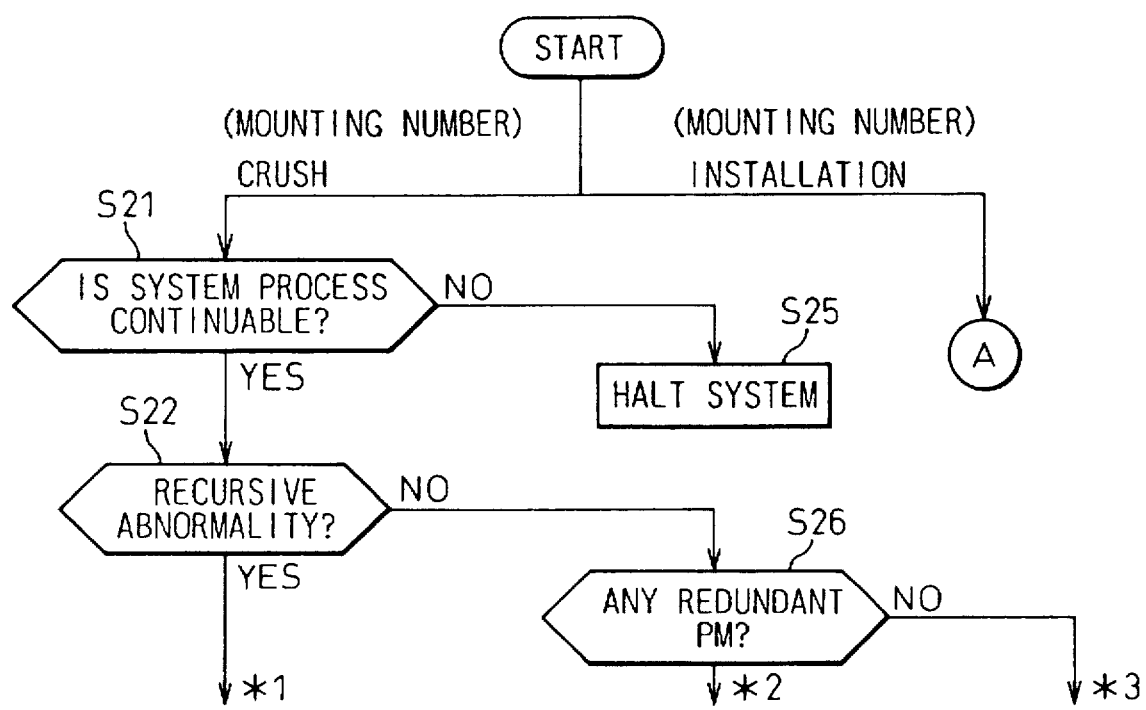
FIGS. 8A and 8B explain procedures (part 1) to deal with a crash or an installation of i processor module, according to the present invention.
Figure 8B:
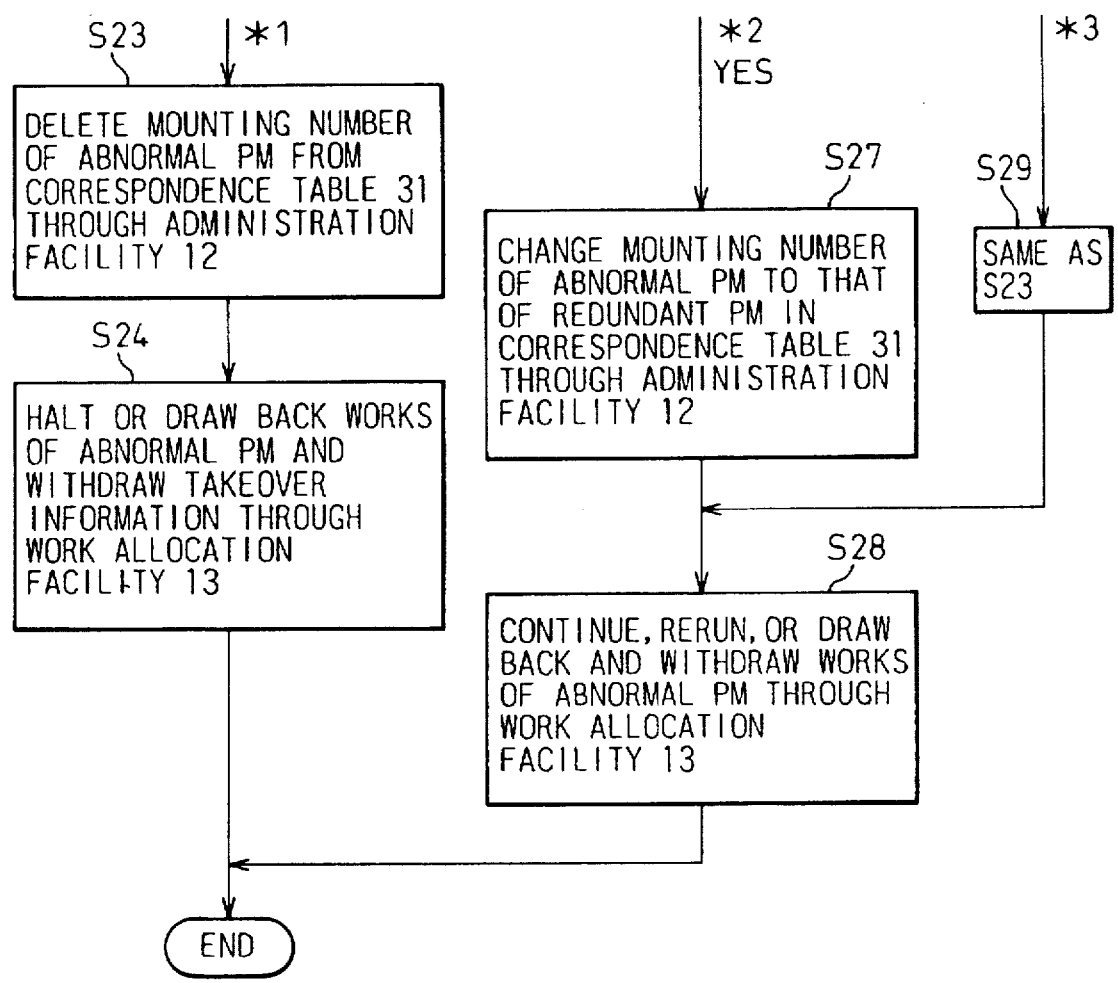
Figure 9A:
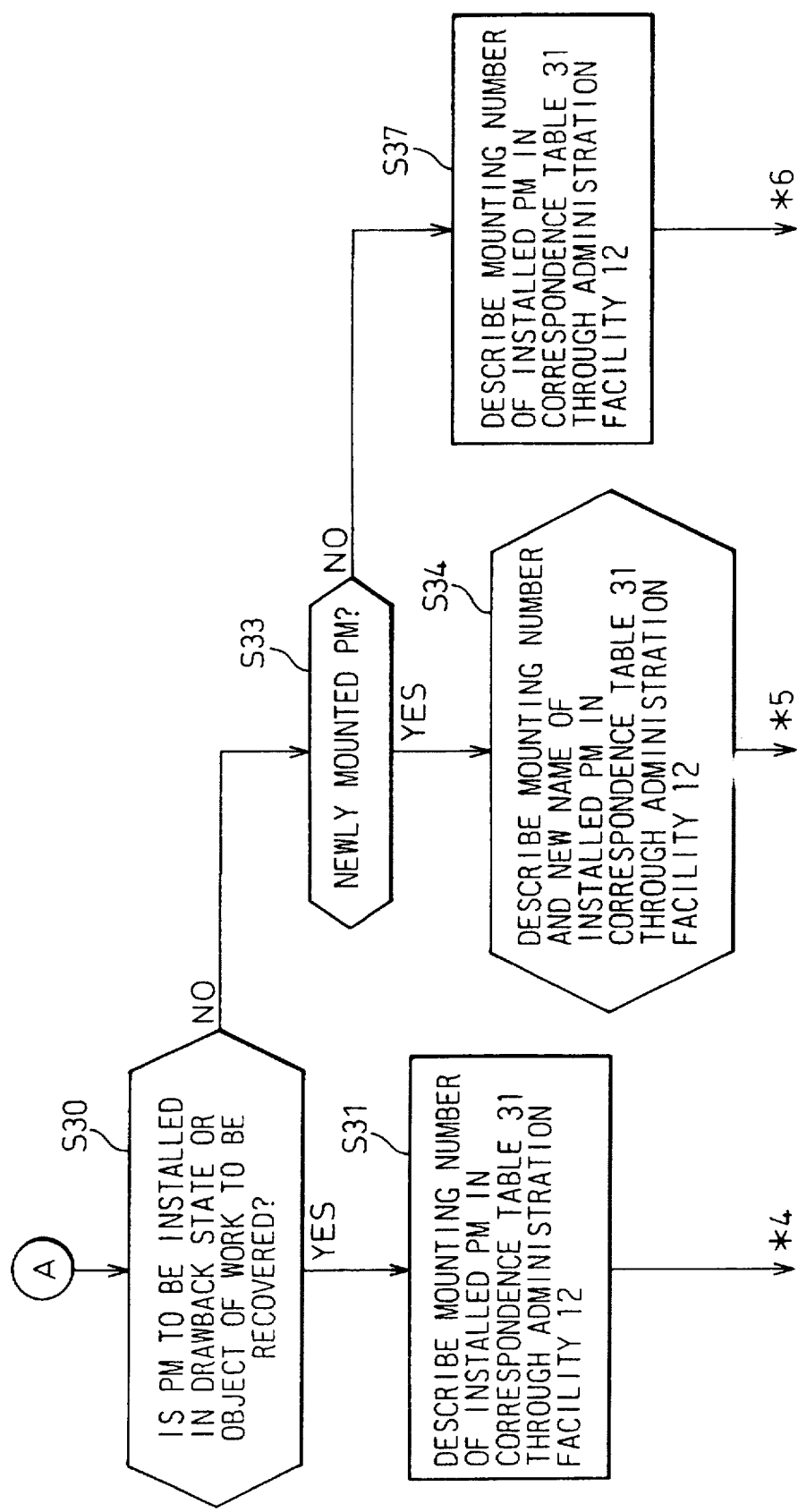
Figure 10A:
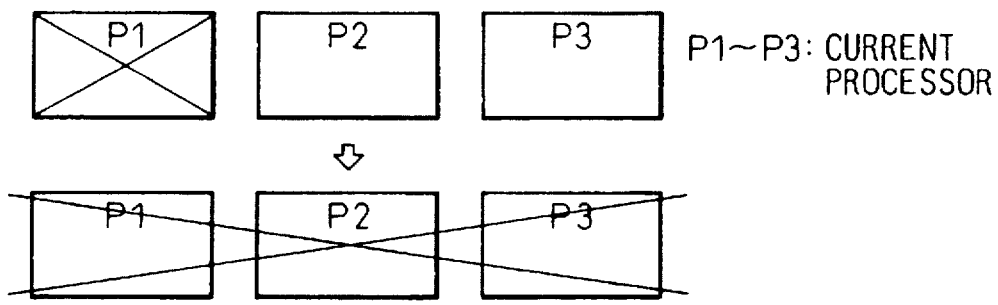
FIGS. 10A to 10D show examples of conventional measures to deal with a processor abnormality.
Figure 10B:
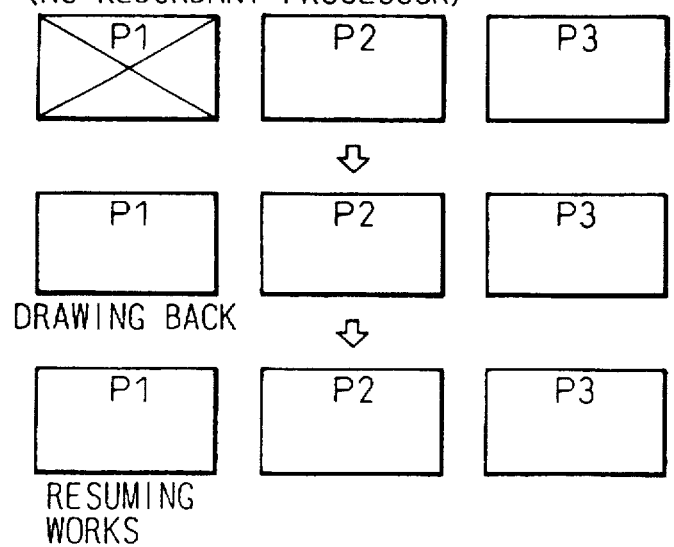
Figure 10C:
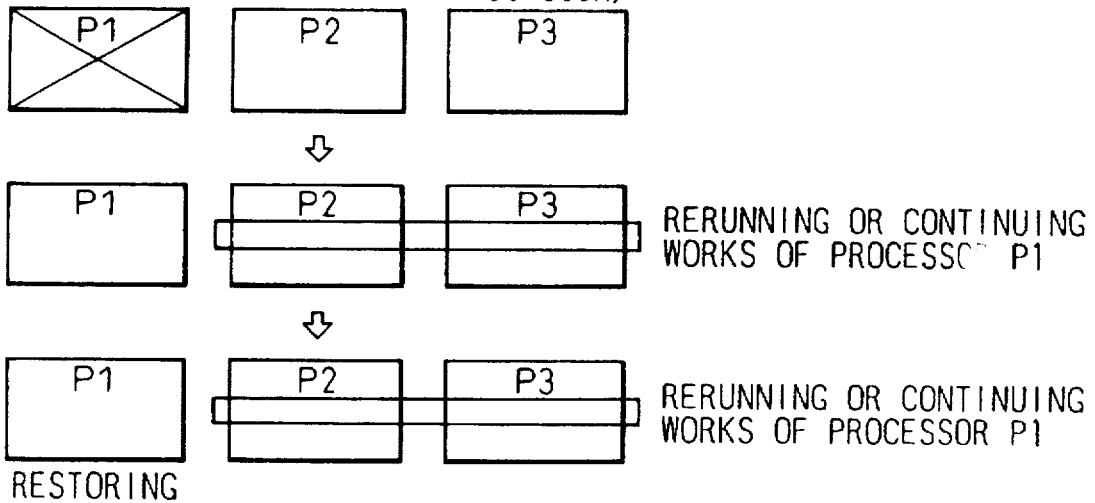
Figure 10D:
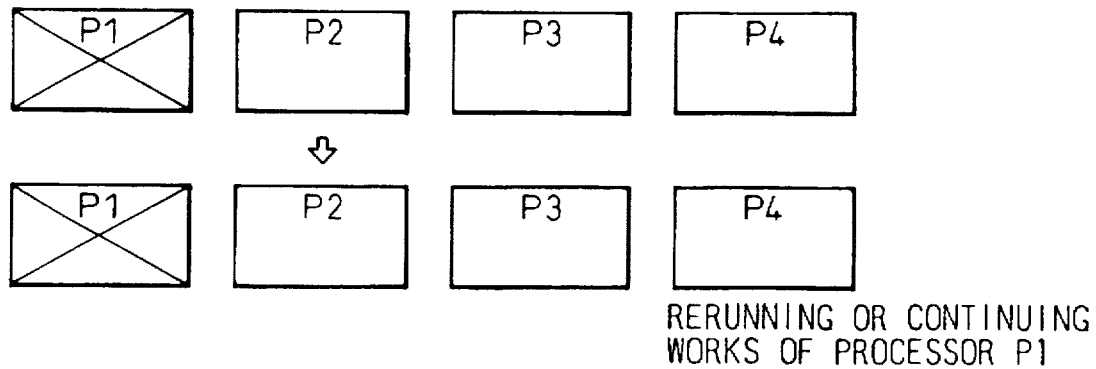

FIGS. 8A, 8B, 9A, and 9B explain procedures for processing a crush (an abnormality) or an installation. Steps S21 to S29 of FIGS. 8A and 8B are for processing the crush, and steps S30 to S37 of FIGS. 9A and 9B are for processing the installation. The crush and installation are notified with the mounting number of the PM that has caused the crush or installation.

Step S21 determines whether or not a system process must be continued. If YES, step S22 is carried out, and if NO, step S25 is carried out. The step S21 may provide NO when the importance of the crushed (abnormal) PM in the system is high. Information about the importance of each PM is kept by the administration facility 12.

The step S22 refers to the abnormality classification table 32, to determine whether or not the abnormality of the PM is recursive. If YES, step S23 is carried out, and if NO, step S26 is carried out In the step S23, the administration facility 12 deletes the mounting number of the abnormal PM from the correspondence table 31 and step 24 is carried out. At this time, the name of the abnormal PM is notified to the work allocation facility 13.

In step S24, the work allocation facility 13 halts or draws back each work of the abnormal PM and withdraws the take-over information of the work from the shared memory 28. The drawback measure is taken when the recursive abnormality is due to an error in the take-over information of the work. In this case, the take-over information is deleted, and the work in question is rerun by the same PM.

The step S25 halts the system.

In the step S26, the administration facility 12 refers to the correspondence table 31 and determines whether or not there is a redundant PM. If YES, step 527 is carried out, and if NO, step S29 is carried out.

In the step S27, the administration facility 12 changes a mounting number related to the name of the abnormal PM to the mounting number of the redundant PM in the correspondence table 31 and step 28 is carried out. For example, if the abnormal PM has a mounting number of #001 and a name of "pm0a" in the correspondence table 31, the mounting number under the name "pmu0a" is changed to #004 which is of the redundant PM.

In step S28, the work allocation facility 13 selects, for each of the works of the abnormal PM, a measure such as continuation, rerun, or drawback and withdrawal.

In step S30, the administration facility 12 determines whether or not the PM to be installed is in a drawback state or is an object of recovery of a work. If YES, step S31 is carried out, and if NO, step S33 is carried out. The administration facility 12 holds information used to make this determination in the form of a record of mounting numbers described in the correspondence table 31 or a record of reports from the work allocation facility 13. The PM will be an object of recovery of a work if the continuation-recovery measure or the rerun-recovery measure described in the abnormality measures table 34 has been taken for the work.

In the step S31, the administration facility 12 describes the mounting number of the PM to be installed in the correspondence table 31 and step 32 is carried out. If the original name of the PM has been used by a redundant PM, a new name is given to the mounting number of the PM.

In step S32, the work allocation facility 13 releases the blocking of the PM and resumes works of the PM that have been drawn back, or recovers them. If the step S31 provides the PM with a new name, the work table 33 must be updated regarding the new PM for the work accordingly.

Step S33 determines whether or not the PM to be installed is a newly mounted PM. If YES, step S34 is carried out, and if No, step S37 is carried out. The mounting of the newly installed PM is usually made to improve the performance of the system. In this case, works to be allocated to the PM are described in the work table 33 by a new PM name.

In the step S34, the administration facility 12 describes the mounting number in correspondence with new name of the PM in the correspondence table 31 and step 35 is carried out.

Step S35 determines whether or not the works of the PM are described in the work table 33. If YES, step S36 is carried out, and if NO, the process ends, or the new PM name written by the step S34 is deleted from the table 31 and this PM is used as a redundant PM.

In the step S36, the installed PM executes the corresponding works described in the table 33.

In the step S37, the administration facility 12 describes the mounting number of the installed PM in the correspondence table 31. In this case, the installed PM is used as a redundant PM.

As explained above, the present invention employs an abnormality measures table that selectively describes measures to deal with an abnormality for each of works shared by processors of a multiprocessor system. If a recursive abnormality occurs during a recovery of an abnormal processor or during a change-over to a substitute processor, the system determines that the recursive abnormality is caused by software. In this case, the system suppresses to allocate the works of the abnormal processor to substitute processors by achieving rerun or continuation. If a redundant processor is being initialized, the system delays to allocate works to the redundant processor.

In this way, the present invention provides a variety of measures to deal with a processor abnormality in a multiprocessor system, suppresses an expansion of the abnormality, and effectively uses a redundant processor, thereby improving the fault tolerance of the system.

I claim:

1. In a multiprocessor system having processors for processing distributed processes, a monitoring facility for detecting an abnormality in any one of the processors, an administration facility for providing information about an abnormal processor and information about a redundant processor, and a work allocation facility for seeking the distributed processes of the abnormal processor from a work table according to these pieces of information and allocating the distributed processes of the abnormal processor to given ones of the processors, a method of dealing with the abnormal processor comprising:

storing in an abnormality measures table data that describes actions to be taken for each of the distributed processes in response to an abnormality;

determining by the work allocation facility, for each of the distributed processes of the abnormal processor, an action to be taken according to the abnormality measures table and allocating the distributed processes of the abnormal processor to given ones of the processors accordingly;

managing by the administration facility to determine information about a possibility of the abnormality being recursive;

suspending by the work allocation facility an allocation of the distributed processes to the processors and reallocating the distributed processes to each processor for rerun or continuation if the administration facility notifies that the abnormality may be recursive;

managing by the administration facility to determine information about whether the redundant processor is being initialized; and delaying by the work allocation facility an allocation of any process to the redundant processor if the administration facility notifies that the redundant processor is being initialized.

2. An apparatus for dealing with a processor abnormality in a multiprocessor system having processors to process distributed processes, comprising:

a monitoring facility to detect an abnormality in any one of the processors;

an administration facility to provide information about an abnormal processor detected by said monitoring facility and information about a redundant processors to administrate information about a possibility of the abnormality being recursive, which may occur during a change-over due to the allocation and to administrate information about whether the redundant processor is being initialized;

an abnormal measures table to describe actions to be taken for each of the distributed processes in response to an abnormality; and a work allocation facility to receive the information provided by said administration facility and to determine the distributed processes of the abnormal processor from a work table according to these pieces of information to allocate the distributed processes of the abnormal processor to given ones of the processors according to the actions described in the abnormality measures tables, to suspend allocation of the distributed processes to the processors and re-allocating the distributed processes to each processor for rerun or continuation if the administration facility notifies that the abnormality may be recursive and to delay an allocation of any process to the redundant processor if the administration facility notifies that the redundant processor is being initialized.

3. The apparatus of claim 2, further comprising:

an abnormality classification table describing states of processors and possibility of recursive abnormality.

4. The apparatus of claim 2, wherein the actions of said abnormal measures table include halt, drawback, rerun and continuation to deal with an abnormality for each operating system, each subsystem and each process.

* * * * *

UNITED STATES PATENT AND TRADEMARK OFFICE
CERTIFICATE OF CORRECTION

PATENT NO.   : 5,796,937
DATED        : August 18, 1998
INVENTOR(S)  : Yoshitaka KIZUKA It is certified that error appears in the above-identified patent and that said Letters Patent is hereby corrected as shown below:

| | |
|---|---|
| Col. 2, | line 38, change "i" to --a--. |
| Col. 3, | line 1, delete "1". |
| Col. 4, | line 15, change "he" to --the--. |
| Col. 8, | line 44, change "537" to --S87--. |
| Col. 9, | line 8, change "527" to --S27--;<br>line 15, change " "pmu0a" " to --"pm0a"--;<br>line 45, change "No" to --NO--. |
| Col. 10, | line 62, after "processors" insert --,--. |
| Col. 12, | line 9, begin a new paragraph with "the actions". |

Signed and Sealed this

Ninth Day of March, 1999

Attest:

Q. TODD DICKINSON

*Attesting Officer*   Acting Commissioner of Patents and Trademarks